F. P. CASTANIEN.
Corn-Planter.

No. 224,872.    Patented Feb. 24, 1880.

Witnesses:
Fred. G. Dieterich
J. C. Littell

Inventor:
Franklin P. Castanien,
by C. A. Snow and Co.
Attorneys.

4 Sheets—Sheet 2.

F. P. CASTANIEN.
Corn-Planter.

No. 224,872. Patented Feb. 24, 1880.

Witnesses:
Fred G. Dieterich
W. Littell

Inventor:
F. P. Castanien,
by C. A. Snow & Co.
Att'ys.

N. PETERS, PHOTO-LITHOGRAPHER, WASHINGTON, D. C.

F. P. CASTANIEN.
Corn-Planter.

No. 224,872.  Patented Feb. 24, 1880.

Witnesses:
Fred G. Dieterich
J. R. Littell

Inventor:
Franklin P. Castanien,
by C. A. Snow and Co.
Attorneys.

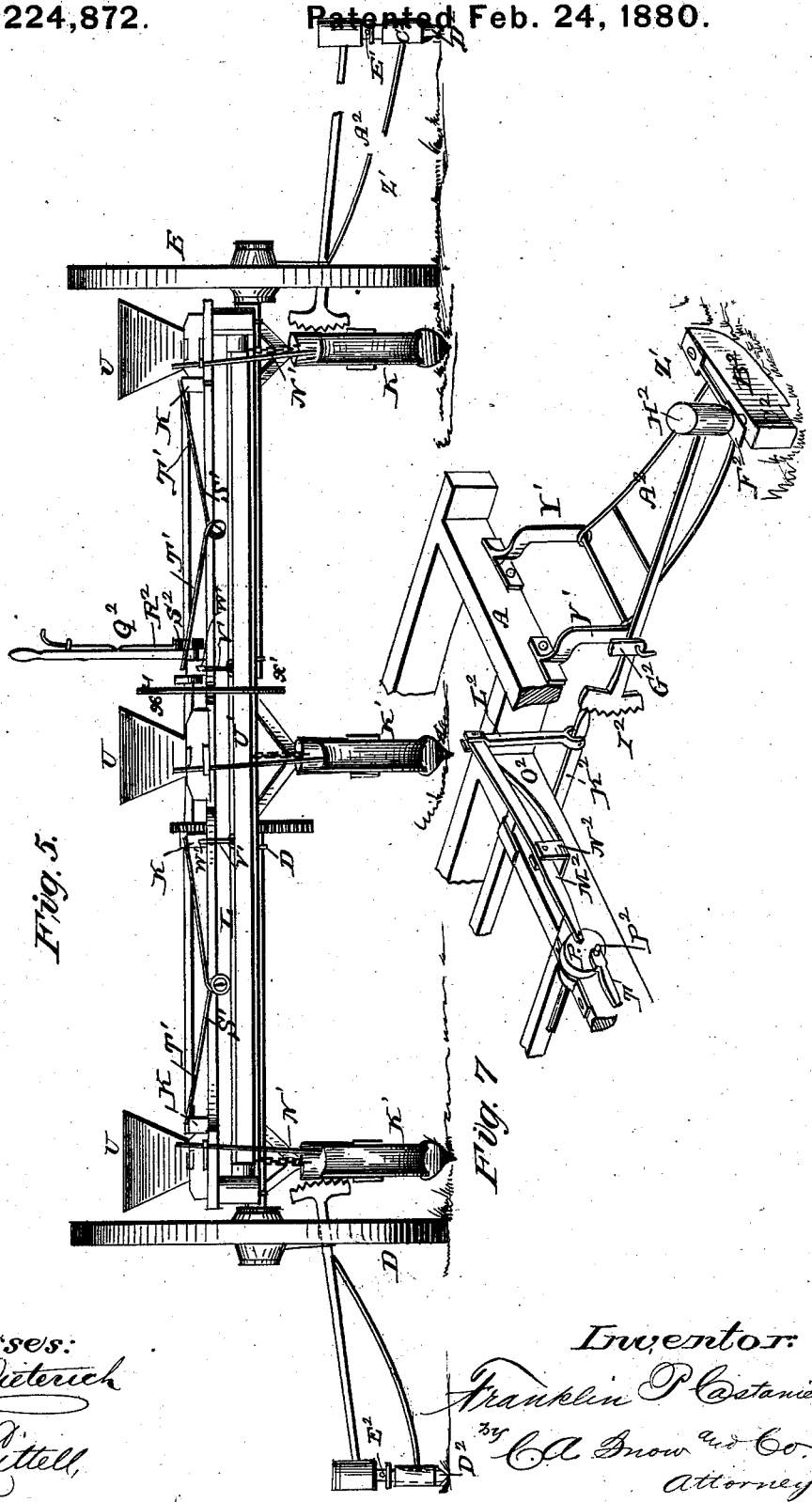

UNITED STATES PATENT OFFICE.

FRANKLIN P. CASTANIEN, OF UPPER SANDUSKY, OHIO.

CORN-PLANTER.

SPECIFICATION forming part of Letters Patent No. 224,872, dated February 24, 1880.

Application filed December 17, 1879.

*To all whom it may concern:*

Be it known that I, FRANKLIN P. CASTANIEN, of Upper Sandusky, in the county of Wyandot and State of Ohio, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

Figure 1:
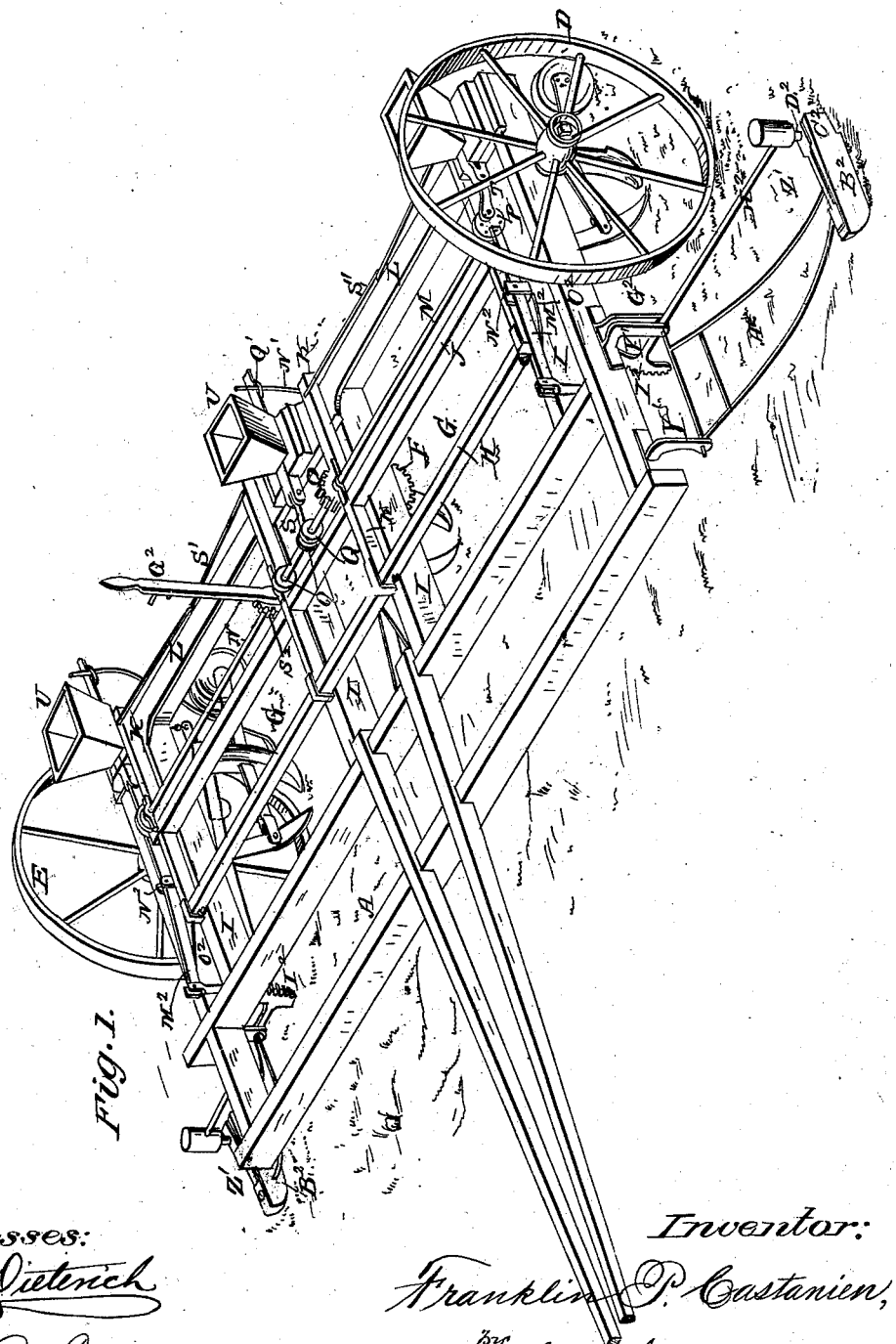
Figure 2:
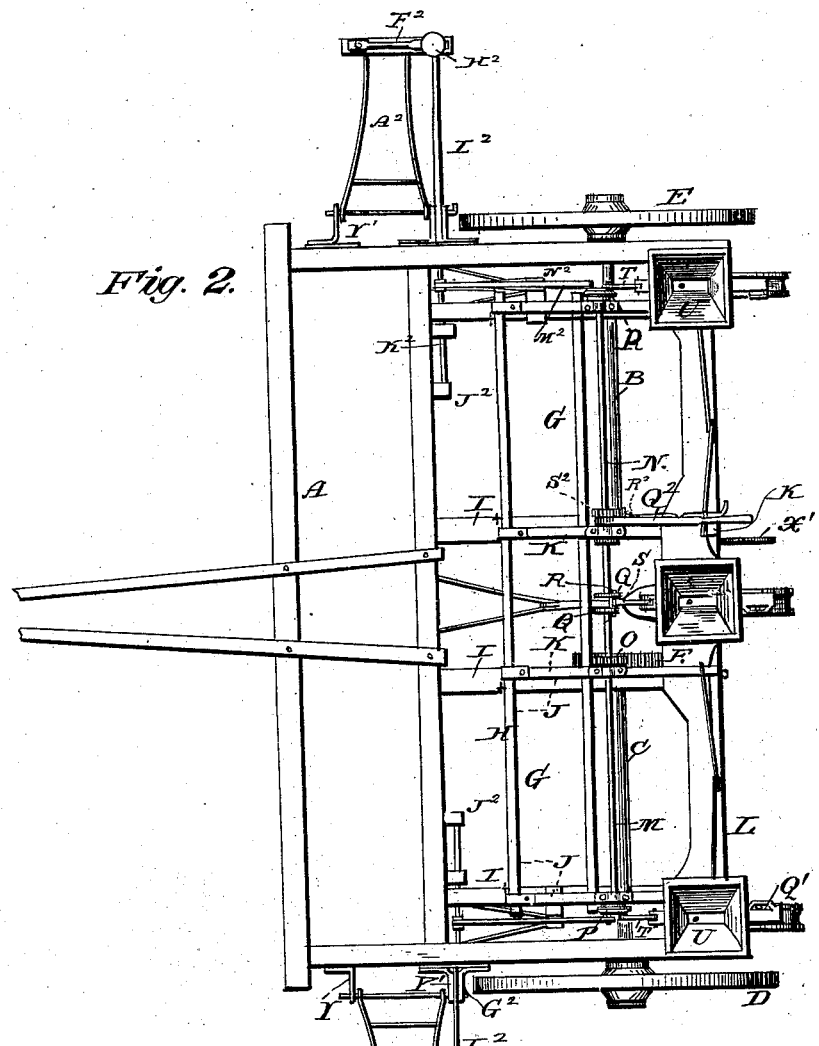
Figure 3:
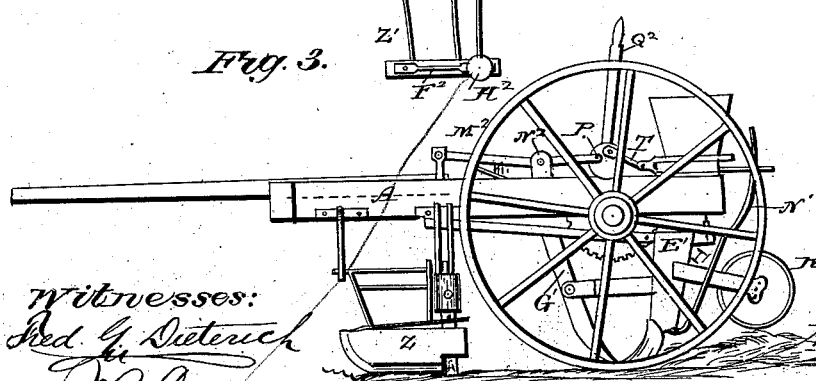
Figure 4:
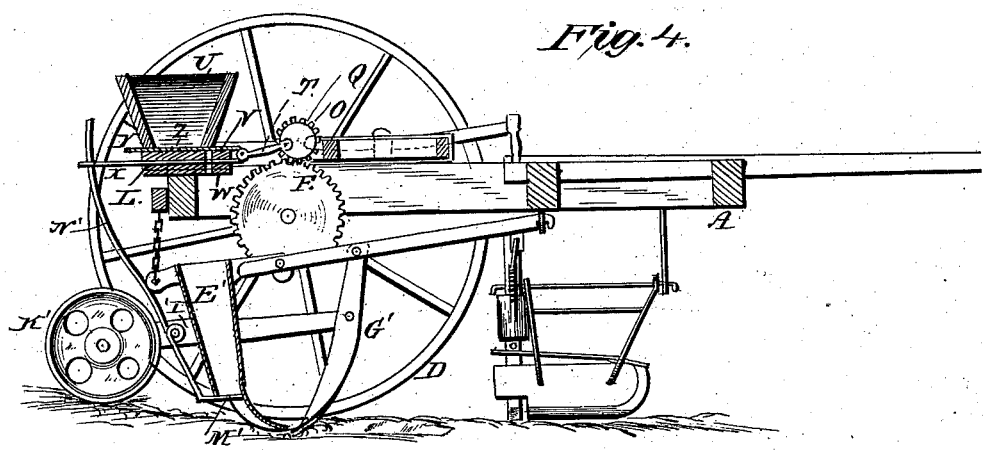
Figure 6:
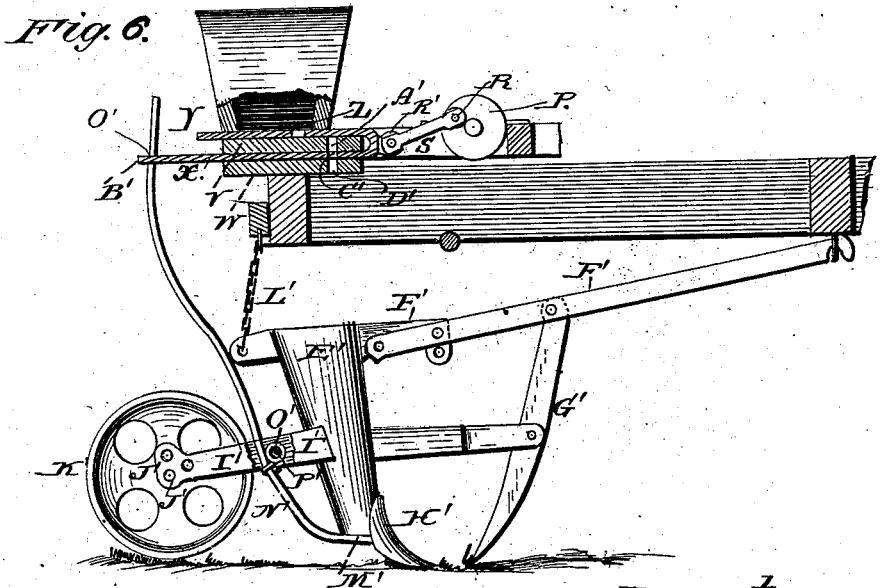

Figure 1 is a perspective view. Fig. 2 is a top plan. Fig. 3 is a side view. Fig. 4 is a longitudinal section through one of the hoppers. Fig. 5 is a rear elevation. Fig. 6 is a detail view, partly in section, of one of the hoppers, seed-tube, and attachments; and Fig. 7 is a detail view of the marking mechanism.

Corresponding parts in the several figures are denoted by like letters of reference.

This invention relates to check-row corn-planters; and it consists in certain improvements in the construction of the same, which will be hereinafter fully described, and particularly pointed out in the claims.

In the annexed drawings, A represents the main frame of the machine, which is provided with two stub-axles, B C, the former of which is rigidly secured, while the latter revolves in suitable boxes or bearings. D E represent the transporting-wheels, the latter of which is loose upon the fixed axle B, while the former is keyed or otherwise rigidly secured upon the revolving axle C. The latter is provided at its inner end with a gear-wheel, F, by which motion is imparted to the operating mechanism of the machine.

G is an upper or secondary frame, the front beam, H, of which is hinged to two or more of the longitudinal cross-pieces, I, of frame A. The frame G is composed of transverse beams J J, united by longitudinal cross-pieces K K, which latter extend rearwardly a short distance beyond the rear frame-piece, L, of frame A. The cross-pieces K K of frame G furnish bearings for two transverse shafts, M N, placed in a line with each other and coupled together, as will be hereinafter described.

The shaft M is provided with a rigidly-secured pinion, O, engaging the gear-wheel F at the inner end of the loose axle C. At their respective ends the shafts M N are provided with disks P P Q Q. The latter, which are at the inner ends of the shafts, face each other, as shown, and are connected by a pin, R, upon which is pivoted a pitman or connecting rod, S. Similar connecting-rods T T are pivoted eccentrically upon the outer faces of the disks P P.

The seed-boxes U U are arranged upon the rear beam, L, of frame A, and are constructed, in the usual manner, with double bottoms V W, having suitable channels to accommodate the longitudinally-reciprocating double seed-slides X, each of which consists of two leaves, the upper ones of which, Y, are provided with perforations or cups Z, that take the seed from the hoppers, carry it forward, and drop it into the cups A' in the upper bottom, V, where it remains supported upon the lower leaf, B', of the seed-slide until the latter is moved in a rearward direction, when it drops through the openings C' D' into the seed-tube E'.

The seed-tubes are provided with brackets F', by which they are hinged to the under side of the frame A. Colters G' project downward from brackets F' in front of the seed-tubes, which are provided with shovels or furrow-openers H'.

I' I' are arms or brackets projecting from the tubes E' E' in a rearward direction, and each provided with a vertical series of perforations, J' J', forming bearings for the vertically-adjustable covering-wheels K'.

The seed-tubes are connected by chains L' with the under side of the rear frame-piece, L, of frame A, and are thereby prevented from dropping down lower than may be desired.

The openings at the lower ends of the seed-tubes are closed by doors M', attached to rods N', pivoted between the rearward-projecting arms or brackets I' I' of the seed-tubes by transverse pins O' O', upon which springs P' P' are coiled, which act against the rear sides of the rods N', thereby tending to keep the doors M' automatically closed.

The upper ends of the rods N' are confined in perforations Q' in the lower leaves, B', of the seed-slides, which project rearward a sufficient distance for this purpose.

It will be seen that when the seed-slides are reciprocated the doors of the seed-tubes are, through this mechanism, alternately opened and closed.

The front ends of the seed-slides are provided with vertical recesses R', to accommodate the rear ends of the pivoted connecting-rods S T T, by which the said seed-slides are operated.

S' S' are suitably-constructed springs secured to the rear frame-piece, L, of the main frame A, and having free ends T' T' pressing upon the rear ends of the cross pieces K K of frame G, thus tending to hold the latter down flat upon frame A, in which position of said frame the pinion O of shaft M meshes with the gear-wheel F upon the axle C.

U' is a rock-shaft, journaled in suitable bearings in rear of the frame-piece L, and having upward-projecting hinged rods V' V', which enter recesses W' in the rear ends of the cross-pieces K of frame G. Shaft U' is also provided with a lever, X', arranged convenient to the driver's seat, and by means of which it may be turned in a forward direction, thus, through the medium of the hinged rods V' V', lifting the rear end of the hinged frame, the effect of which is to throw pinion O and gear-wheel F out of gear.

Suitable brackets Y' are provided upon the sides of the planter-frame A for the markers Z', which consist simply of hinged vertically-movable frames $A^2$, carrying at their outer ends the sleds $B^2$. The latter are provided with rearward-projecting brackets $C^2$, having vertical perforations, in which slide the chisels $D^2$, which latter are provided at their upper ends with transverse pins $E^2$, by which they rest upon springs $F^2$ on top of the sleds, the function of the springs being to keep the said chisels elevated from the ground.

Between one of the brackets Y' and an additional bracket, $G^2$, on each side of the frame is pivoted a hammer, $H^2$, the head of which rests upon and is adapted to strike the chisel $D^2$, while the inner end of the handle is provided with a segmental rack, $I^2$. To brackets $J^2$, projecting downward from frame A on each side of the machine, are pivoted arms $K^2$, projecting outward sufficiently far to engage the racks $I^2$ of the hammers for the purpose of operating the latter.

Arms $K^2$ are connected, by pivoted rods $L^2$, with the forward ends of levers $M^2$, fulcrumed in brackets $N^2$, projecting upward from frame A. The forward ends of the levers $M^2$ are supported by springs $O^2$, which, as will be seen, tend to support the arms $K^2$ in an elevated position out of engagement with the racks $I^2$.

The pins $P^2$, by which the connecting-rods T T are pivoted upon the disks P P, project outward a sufficient distance to strike the rear ends of and thus operate the levers $M^2$ once during each revolution of said disks.

The shaft N is provided with a loose lever, $Q^2$, having a slide or pawl, $R^2$, engaging a pinion or ratchet, $S^2$, secured fixedly upon said shaft. By means of this mechanism the shafts M N, which, as above described, are coupled together, may be readily turned by the operator for the purpose of adjusting the seed-slides in any desired position.

From the foregoing description, taken in connection with the drawings hereto annexed, the operation and advantages of my invention will be readily understood.

The machine may be thrown into or out of gear by lowering or raising the supplementary frame G, carrying the operating-shafts M N. By the revolution of the latter the seeding and marking mechanisms are operated. The seed, which is temporarily supported upon the doors of the seed-tubes, has but a short distance to fall when the latter are opened for the purpose of dropping, and is therefore not liable to be misplaced, and the covering-wheels which follow the seed-tubes do not compress the ground to any excessive extent, as is the case when heavier weights than that of the seed-tubes are superimposed upon said wheels.

Having thus described my invention, I claim and desire to secure by Letters Patent of the United States—

1. The combination of the frame A, hinged frame G, having cross-pieces K projecting in rear of frame A, and provided with recesses W', springs S', and rock-shaft U', having lever X' and hinged rods V', entering the recesses W', substantially as and for the purpose set forth.

2. The herein-described marking mechanism for corn-planters, consisting of the hinged frames $A^2$, sleds $B^2$, having chisels $D^2$ and springs $F^2$, supporting the latter, hammers $H^2$, having segmental racks $I^2$, pivoted arms $K^2$, connecting-rods $L^2$, levers $M^2$, springs $O^2$, and eccentric pins $P^2$ upon the disks P P of operating-shafts M N, all combined, arranged, and operating substantially as and for the purpose herein set forth.

In testimony that I claim the foregoing as my own I have hereto affixed my signature in presence of two witnesses.

FRANKLIN P. CASTANIEN.

Witnesses:
ROBERT CASEY,
ALEX. LITTLE.